United States Patent Office 3,528,932
Patented Sept. 15, 1970

3,528,932
IRON-ARSENIC OXIDE CATALYSTS
Derk Th. A. Huibers, Berkeley Heights, and John J. Waller, Jersey City, N.J., assignors to The Lummus Company, New York, N.Y., a corporation of Delaware
No Drawing. Filed May 9, 1966, Ser. No. 548,396
Int. Cl. B01j 11/82; C07b 3/00; C07c 121/02
U.S. Cl. 252—472          10 Claims

ABSTRACT OF THE DISCLOSURE

Iron-arsenic catalyst compositions, suitable for ammoniation and ammoxidation reactions, as well as conversions of aldehydes to nitriles, and other reactions. The catalysts are prepared by adding an aqueous arsenate salt solution to an aqueous ferric salt solution, adjusting the pH value of the resulting solution to between 0.5 and 6, evaporating and calcining the product. The quantities of the arsenate and ferric salts are so chosen as to produce a catalyst having an atomic ratio of iron to arsenic of 1.1:1 to 10:1. Reactions using the catalyst are also disclosed.

---

This invention relates to a process for preparing novel catalytic compositions and to catalytic reactions in which they are employed. More specifically, the invention relates to arsenic- and iron-containing catalysts having substantial activity and selectivity in the ammoniation and ammoxidation of olefins.

During the recent years, reaction of olefins such as proplyene with ammonia to form corresponding unsaturated nitriles such as acrylonitrile has been identified as "ammoniation." Similarly, when the olefin-ammonia charge also includes an active oxygen-containing gas such as air, the reaction has been designated "ammoxidation."

A number of catalyst compositions have been proposed and some have been used in ammoniation and ammoxidation operations. While some are effective, they are not wholly satisfactory with respect to selective conversion of olefin to the corresponding unsaturated nitrile. Generally, substantial quantities of olefin are consumed in less desirable or undesirable side reactions. Then, too, some of the catalysts have limited activity and useful life. A further shortcoming is the relatively low yield of desired product per unit weight of catalyst per hour of on-stream time. Finally, the presently used catalysts are costly because their ingredients are in short supply.

For example, antimony oxide-iron oxide catalysts have been described for use in ammoxidation of olefins to nitriles, particularly propylene to acrylonitrile. While substantial conversion of propylene to the desired nitrile is realized with the antimony-iron catalysts, considerable loss results with the formation of carbon oxides and other by-products. Selectivity, then, is subject to improvement. Similarly, the yield of acrylonitrile per unit weight of catalyst is also subject to improvement.

Arsenic- and iron-containing catalyst compositions are also known for reactions other than ammoniation and ammoxidation. By way of illustration, iron arsenite and iron arsenates are described for converting aldehydes to nitriles using ammonia and oxygen. Such catalysts have been found to have little activity for the reactions of propylene-ammonia and propylene-ammonia-oxygen to form acrylonitrile.

The present invention is predicated upon discovery of new arsenic- and iron-catalysts having substantial selectivity and activity for ammoniation and ammoxidation, and of a process for preparing the catalysts.

It is an object of the present invention, therefore, to provide new catalyst compositions. Another object is to provide catalysts having excellent catalytic activity and/or catalytic selectivity. A further object is to provide such catalysts adapted for ammoniation and ammoxidation reactions. Still another object is to provide a process for making the catalyst compositions. A specific object is to provide a process for forming acrylonitrile with such catalysts. Other objects of the invention will be apparent from the following description.

In accordance with the present invention, there is provided a process for making an arsenic- and iron-containing catalyst composition, comprising:

(a) adding an aqueous solution of an arsenate salt to an aqueous solution of a ferric salt,
(b) adjusting the pH of the resulting solution with sufficient base to maintain the pH thereof between about 0.5 and about 6,
(c) evaporating the resulting solution of (b), and
(d) calcining the product of (c), thereby obtaining said catalyst having an atomic ratio of iron to arsenic (Fe/As) from about 0.1:1 to about 10:1, and preferably 0.5:1 to 1.5:1.

In accordance with the present invention, there are also provided novel catalysts, particulary catalysts prepared by the process described above.

Another embodiment of the present invention comprises the process for the production of nitriles having from 3 to about 12 carbon atoms per molecule, which comprises contacting, at a temperature between about 400° C. and about 500° C. and a contact time from about 0.1 second to about 10 seconds, a gaseous mixture comprising certain unsaturated hydrocarbons having from 3 to about 12 carbon atoms per molecule and ammonia in the presence of a catalyst formed by the process described above. Still another embodiment involves a related ammoxidation process in which the gaseous charge mixture includes an active oxygen-containing gas.

As indicated above, the catalysts of this invention are prepared by adding an aqueous solution of an arsenate salt to an aqueous ferric salt solution, while thoroughly agitating the same. The arsenate can be an alkali metal salt, alkaline earth metal salt or ammonium salt including $(NH_4)_2HAsO_4$, $(NH_4)H_2AsO_4$ and

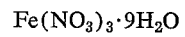
$(NH_4)_3AsO_4 \cdot 3H_2O$

Ammonium salts are preferred. Correspondingly, a variety of ferric salts are contemplated. The ferric salts include: nitrate, chloride, acetate and sulfate;

$Fe(NO_3)_3 \cdot 9H_2O$ is preferred. From about 0.1 to about 10 molar proportions of arsenate are generally used for each molar proportion of ferric salt, such that the final catalyst composition has an arsenic content and an iron content as expressed above in (c).

In addition to using aqueous arsenate and aqueous ferric salt solutions, it has been found that certain solvents can also be included to advantage. The solvents provide maximum atomic contact of iron- and arsenic-containing components in the preparation of the catalysts, and effect the porosity of the catalysts. The solvents are nitrogen-containing compounds having a solubility in water of at least about 5 percent by volume. Typical of such solvents are dimethyl formamide, acetamide, methylamine, diethanolamine, and acetonitrile.

It has been found that the order of addition is important for the production of the desired catalyst. When a clear aqueous ammonium arsenate solution (pH, 4.0) is added with agitation to a clear ferric nitrate solution (pH, 0.5), no precipitate is formed. Whereas, upon reversal of the order of addition, it was surprisingly found that a ferric hydroxide-containing precipitate is formed; this precipitate does not readily go into solution again during the preparation. Further, by proceeding with the preparation following production of this precipitate, by evaporating water and ammonia and subsequently calcining, a composition differing from the desired catalytic composition is produced because iron and arsenic moieties exist separately.

After the arsenate solution has been added to the ferric salt solution, alkali—preferably aqueous ammonia—is added to the resulting solution in order to control pH of the latter. Other alkaline materials which can be used include lower aliphatic amines, NaOH, KOH, $Ba(OH)_2$ and $Ca(OH)_2$. Surprisingly, when the pH is below about 0.5 and above about 6, the final catalytic compositions have substantially lower activity than do those formed with a pH at this stage within the approximate range of 0.5–6. Preferably, the pH ranges from about 1 to about 4, and especially about 4.

Following adjustment of pH, the resulting product is evaporated in order to remove water and free ammonia therefrom. Generally, this can be accomplished by heating to from about 50° C. to about 105° C. for a suitable period of time. Upon evaporation, a solid mass is formed. The mass is crushed or pulverized to size as about 20 mesh, by conventional means, and the resulting particles are then calcined. Alternatively, the mass may be calcined directly. The particles are calcined conveniently in a furnace at 450° C. for 2 hours; however, temperatures from 400° C. to 700° C. can be used for time intervals of 10 hours to 0.5 hour. The temperature should be increased slowly in order to obtain catalysts having a high order of activity.

The catalyst compositions per se can be used or they can be used in conjunction with known supports and extenders in conventional manner. Thus, they can be mixed with silica, diatomaceous earth, pumice, clays and the like. They can be supported on such substrates or mixed therewith. They can be used for ammoniation and ammoxidation in fixed or moving bed operations, the latter being illustrated by fluid bed and TCC type techniques.

Hydrocarbons used herein for the formation of nitriles have from 3 to about 12 carbon atoms per molecule and have the characterizing group

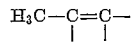

Thus, a methyl group is attached to a trigonal carbon atom in such hydrocarbons. Mono- and poly-olefins are represented by propylene, isobutene, 3-methyl-1-pentene and 1,4-hexadiene. Suitable aromatic hydrocarbons are typified by toluene, xylenes, mesitylene, 1, 2, 4, 5-tetramethyl benzene and methyl naphthalenes.

In ammoniation, molar ratios of hydrocarbon to ammonia of 0.5:1 to 2:1, per methyl group, are employed. Generally, a diluent such as nitrogen or steam is included in the charge. Temperatures ranging from about 400° C. to 500° C. are used, with residence times of 10 seconds to 0.1 second. Preferred conditions are 425–475° C., and 4 seconds to 1 second.

Reaction conditions for ammoxidation are substantially the same as those given directly above. However, an active oxygen-containing gas is also charged. Gases include oxygen, oxygen-steam mixtures and oxygen-nitrogen mixtures such as air, with the last-mentioned preferred. Molar ratios of ammonia to oxygen are 5:1 to 0.5:1, and of olefin to oxygen 5:1 to 0.5:1. Oxygen serves to maintain the catalytic activity of the catalyst compositions, obviating or lessening the need to remove and separately reoxidize them.

The catalysts can be reactivated when heated in the presence of an active oxygen-containing gas, such as air, at a temperature of from about 350° C. to about 700° C.

The invention is illustrated by the following examples.

The reactor used in several of the illustrative examples comprises a ⅜ inch inside diameter tube confined in a furnace which is heated electrically. A preheater section of the tube is filled with inert material, such as carborundum. A reactor section of the tube is filled with catalyst. Gases charged to the reactor are passed through rotameters. The exit line from the reactor is maintained at about 110° C. A sample valve is maintained at 110° C. Product gas samples are analyzed in a gas chromatograph, using a diethylhexyl sebacate, 60–80 diaport S column (8' x ¼") at 70° C. with carrier gas (helium) flow rate of 40 cc./min.

EXAMPLE 1

Anhydrous ammonium arsenate (39.8 grams) was dissolved in 200 milliliters (ml.) of distilled water. The solution so obtained was added to and mixed with a solution of 80.8 g. of ferric nitrate nonanhydrate in 200 ml. of water. Concentrated aqueous ammonia was then added to provide a pH of 4.1. The resulting solution was evaporated at 50° C. The solid obtained by evaporation was crushed to size (20 mesh) and was calcined in a tube furnace at 450° C. for 2 hours. The catalyst has a composition represented by $Fe_2O_3 \cdot As_2O_5$. It is a hard yellow solid having a bulk density of 0.59.

EXAMPLE 2

The procedure of Example 1 was followed except for dissolving the arsenate in 200 ml. of dimethyl formamide and 520 ml. of distilled water, before the resulting solution was added to the ferric nitrate solution. The catalyst obtained was yellow ochre in color, has a bulk density of 0.40 and corresponds to the formula $Fe_2O_3 \cdot As_2O_5$.

The new catalytic compositions are effective for ammoniation and ammoxidation, as shown in the following illustrative examples. Comparative examples are also included to demonstrate advantages over related compositions.

EXAMPLE 3

(A) A catalyst, prepared as in Example 1, formed by evaporating a solution with a pH of 1, was charged to the reactor and brought to 460° C. with a nitrogen purge. The quantity of catalyst was 9 grams (10 ml.). A gaseous mixture of 75% nitrogen, 15% propylene and 10% ammonia (by volume) was charged to the reactor at a rate of 244 cc./minute. The effluent gas initially produced contained 2.72% by volume of acrylonitrile and 0.05% by volume of acetonitrile. The conversion to acrylonitrile is thus about 18% on propylene and 27% on ammonia and the selectivity ratio is 98%. The space yield is 114 g. of acrylonitrile per kilogram of catalyst per hours.

(B) By way of comparison to illustrate the importance of maintaining the pH of the solution between 0.5 and 6, the procedure described in (A) was repeated except for operation at 465° C. and a different catalyst. The catalyst was the same as that which is described in Example 1, above, except for adjustment of pH to 7 during its preparation.

The effluent gas initially produced contained 0.57% by volume of acrylonitrile, 0.015% by volume of acetonitrile and 0.052% by volume of HCN. Accordingly, conversion to acrylonitrile is about 3.8% on propylene and 5.7% on ammonia. The selectivity ratio is about 90% and space yields is 27 grams of acrylonitrile per kilogram of catalyst per hour.

(C) An iron- and arsenic-containing catalyst formed in accordance with prior art practice in a strong acid medium was also compared with the catalysts of this invention. The procedure of 3(A) above, was followed with the same charge and charge rate. Reaction temperature was 464° C. and residence time about 1 second. The quantity of catalyst was 7.5 grams (10 ml.). The effluent gas initially produced contained 0.058% by volume of acrylonitrile. Conversion to acrylonitrile was about 0.4% on propylene and 0.6% on ammonia. Space yield is 2.6 grams of acrylonitrile per kilogram of catalyst per hour.

This iron-arsenic catalyst was prepared by dissolving 55.9 g. of iron in a mixture of 250 ml. of nitric acid (density, 1.4) and 500 ml. of water at 90–95° C. An aqueous solution (188.4 g.) of arsenic oxide, 60% by weight, was added thereto. The resulting mixture was evaporated to dryness in an oven at 110° C. The residue was clacined at 450° C. for 24 hours. The mass so obtained was finely ground, homogenized and formed into pastilles.

EXAMPLE 4

The catalyst of Example 3(A) was used. The reactor was charged with 3.9 grams (4.4 ml.) of the catalyst. The catalyst was heated to 440° C. with a nitrogen stream passed over it. A gaseous mixture was charged to the reactor at the rates indicated: 89% $N_2$–11% $O_2$, 300 cc./minute; ammonia, 20 cc./minute and propylene, 20 cc./minute. The effluent gas from the reactor contained 1.23% by volume of acrylonitrile and 0.10% by volume of acetonitrile. The conversion to acrylonitrile is thus about 21% on both propylene and ammonia and the selectivity ratio is 93%. The space yield is 140 grams of acrylonitrile per kilogram of catalyst per hour.

In Table I following, a series of illustrative examples is provided. The reactor referred to in Examples 3 and 4 was employed and the procedure thereof was followed. In the table, the following symbols are used to represent:

A: Reactor feed A comprising (at 20° C., ml./min.) 91.6 $N_2$, 8.4 $O_2$, 12.0 $C_3H_6$, 8.0 $NH_3$; total 120 ml./min.
B: Reactor feed B (at 20° C., ml./min.) 69.7 air, 5.8 $C_3H_6$, 5.8 $NH_3$; total 81.3 ml./min.
AN: Acrylonitrile
AcN: Acetonitrile The effluent gas initially produced contained, by volume: 0.67% methacrylonitrile; 0.58% acrylonitrile and 0.03% acetonitrile. Conversion to nitrogen-containing products is about 8.5% on isobutene and 12.7% on ammonia. Space yields of methacrylonitrile and acrylonitrile, respectively, were 39 and 26 grams per kilogram of catalyst per hour.

EXAMPLE 6

In an ammoxidation procedure, acrylonitrile was formed in larger quantity than methacrylonitrile from isobutene. The procedure of Example 5 was followed with the feed also comprising 18 ml. of air per minute. Reaction temperature was 460° C. Residence time was about 0.93 second.

Corresponding results were: 0.23% methacrylonitrile; 1.69% acrylonitrile and 0.01% acetonitrile. Conversion to nitrogen-containing products is 13.8% on isobutene and 20.8% on ammonia. Space yields of methacrylonitrile and acrylonitrile, respectively, were 14 and 81 grams per kilogram of catalyst per hour.

EXAMPLE 7 p-Xylene was converted to terephthalonitrile (TPN). Charged to the reactor were: 124 ml./min. of ammonia, 0.53 ml./min. water and 0.1 ml./min. of p-xylene. The catalyst quantity was 131.3 grams (200 ml.). The catalyst is Catalyst Composition No. 10 of the table given in Example 4, above. It has a bulk density of 0.657 g./ml. Reaction temperature was 460° C. and contact time 0.56

TABLE I

| Catalyst No. | Grams | Ml. | Temp. °C. | Residence time, sec. | Charge | Products, ml./min. | | | | Conversion to N-containing products | | Selectivity, percent | | Space yield, g. AN kg. cat./hr. |
| | | | | | | AN | AcN | HCN | Total | $C_3H_6$, percent | $NH_3$, percent | $\frac{AN}{AN+AcN}$ | $\frac{AN}{Total\ N\text{-}product}$ | |
| --- | --- | --- | --- | --- | --- | --- | --- | --- | --- | --- | --- | --- | --- | --- |
| 10 | 5.9 | 10 | 469 | 2 | A | 3.55 | 0.12 | | 3.67 | 30.6 | 45.9 | 97 | 97 | 80 |
| 10 | 5.9 | 10 | 450 | 3 | B | 4.72 | 0.21 | | 4.93 | 85.0 | 85.0 | 96 | 96 | 106 |
| 11 | 4 | 10 | 468 | 2 | A | 2.33 | 0.16 | 0.054 | 2.54 | 21.2 | 31.8 | 94 | 92 | 77 |
| 11 | 4 | 10 | 449 | 3 | B | 2.60 | 0.24 | | 2.84 | 49.0 | 49.0 | 92 | 92 | 86 |
| 12 | 3.6 | 10 | 468 | 2 | A | 2.09 | 0.078 | 0.013 | 2.19 | 18.2 | 27.3 | 96 | 96 | 77 |
| COMPARATIVE EXAMPLES | | | | | | | | | | | | | | |
| 13 | 7.4 | 10 | 467 | 2 | A | 2.70 | 0.115 | | 2.82 | 23.5 | 35.2 | 96 | 96 | 48 |
| 13 | 7.0 | 10 | 450 | 3 | B | 1.80 | 0.054 | | 1.86 | 32.0 | 32.0 | 97 | 97 | 34 |
| 14 | 6.4 | 10 | 468 | 2 | A | 2.38 | 0.39 | 0.027 | 2.79 | 23.3 | 34.9 | 86 | 85 | 49 |
| 14 | 6.4 | 10 | 449 | 3 | B | 2.90 | 0.15 | | 3.05 | 52.5 | 52.5 | 95 | 95 | 60 |
| 15 | 10 | 10 | 468 | 2 | A | 2.81 | 0.062 | | 2.87 | 23.9 | 35.9 | 98 | 98 | 37 |
| 15 | 10 | 10 | 448 | 3 | B | 1.83 | 0.114 | 0.018 | 1.96 | 33.8 | 33.8 | 94 | 93 | 24 |

CATALYST COMPOSITION

10: Product of Example 1. $Fe_2O_3 \cdot As_2O_5$. Adjusted pH, 4.1
11: Product of Example 2. $Fe_2O_3 \cdot As_2O_5$.
12: $Fe_2O_3 \cdot As_2O_5$ + 30% (wt.) silica. Adjusted pH, 4.2.
13: $Fe_2O_3 \cdot As_2O_5$; $NH_4NO_3$ added in original solution. Adjusted pH, 0.5.
14: $Fe_2O_3 \cdot 64Sb_2O_5$
15: $Fe_2O_3 \cdot 29Sb_2O_5$ It is to be noted that with Feed B the space yield value was 60 with catalyst composition 14 in comparison with values of 106 and 86 for catalyst compositions 10 and 11, respectively, under comparable conditions. Further, conversion of propylene was 85 percent with catalyst composition 10 as opposed to 52.5 percent with catalyst composition 14.

EXAMPLE 5

Methacrylonitrile was prepared in the absence of oxygen from isobutene and ammonia. The catalyst used was $Fe_2O_3 \cdot As_2O_5$ similar to that of Example 3(A), but with a lower bulk density. Ten (10) millilitres, 10 grams, of the catalyst were used in the reactor following the procedure of Example 3(A). Reaction temperature was 452° C. Residence time was about 1 second, with a charge containing isobutene in place of propylene. The charge comprised 36.6 ml./min. of isobutene, 24.4 ml./min. of ammonia and 183 ml./min. of nitrogen.

second. Space yield of TPN was 6.1 grams per kilogram of catalyst per hour.

It is apparent from comparative examples given above that the catalysts of this invention are not only more active but more selective than related catalysts, since they provide essentially the same yields at high conversion as the related catalysts provide at low conversions.

As indicated above, the catalyst compositions of this invention are characterized by oxides of iron and arsenic such that the atomic ratio of iron to arsenic (Fe/As) is from about 0.1:1 to 10:1 and preferably 0.5:1 to 1.5:1. Iron and arsenic are molecularly dispersed in the compositions, which are generally yellow in color.

The catalyst compositions of this invention can be used for reactions in addition to those indicated above. For example, they can be used for dehydrogenation of hydrocarbons as illustrated by dehydrogenation under known dehydrogenation reaction conditions of temperature and pressure. Temperatures of 400–600° C. and pressure of 1–5 atmospheres are typical. Ethylbenzene can be converted to styrene and butenes to butadiene. Oxygen may be added to the hydrocarbon charge in such dehydrogenations. These reactions can be carried out in the presence or absence of molecular oxygen, and for diluents such as nitrogen or steam.

In another use, these catalysts were used in the air oxidation of methanol to formaldehyde.

Activity and/or selectivity of the new catalyst compositions can be enhanced by incorporation of one or more promoters therein. From about 1 to about 10 percent by weight, based upon the iron- and arsenic-containing composition, of promoter can be used. As contemplated herein, the promoters include the following:

(1) Transition metals which are characterized by atoms in which an inner $d$ level is present but not filled to capacity. These metals are illustrated by bismuth, tin, platinum, cobalt, nickel, vanadium, chromium, titanium, zirconium, molybdenum, tungsten and lead. The metals can be added during the preparation of the catalyst compositions in the form of their oxides or salts, typical of which are sulfates, chlorides, nitrates and acetates.

(2) Alkali metals, alkaline earth metals including magnesium, and aluminum, added in the form of their hydroxides or salts. Selectivity is particularly promoted with such components.

(3) Acids including boric, fluoboric, fluosilicic, phosphoric, antimonic and halogen acids can be added during the catalyst preparation. The acids particularly increase catalyst activity.

What is claimed is:

1. The process for making an arsenic- and iron-containing catalyst composition comprising:
  (a) Adding an aqueous arsenate salt solution to an aqueous ferric salt solution,
  (b) Adjusting the pH of the resulting solution to between about 0.5 and 6,
  (c) Evaporating the resulting solution of (b), and
  (d) Calcining the product of (c), the quantities of the arsenate salt and the ferric salt being so chosen that a catalyst having an atomic ratio of iron to arsenic from 0.1:1 to 10:1 is obtained,
wherein the arsenate salt is an alkali metal arsenate, an alkaline earth metal arsenate, or an ammonium arsenate.

2. The process defined by claim 1 wherein the ferric salt is ferric nitrate.

3. The process defined by claim 1 wherein the arsenate salt is an ammonium arsenate.

4. The process defined by claim 1 wherein the pH of (b) is adjusted to about four.

5. The process defined by claim 1 wherein a nitrogen-containing solvent selected from the group consisting of dimethylformamide, acetamide, methylamine, diethanolamine and acetonitrile is present.

6. The process defined by claim 5 wherein the solvent is dimethyl formamide.

7. The process of claim 1 wherein a minor amount of a catalyst promoter selected from the group consisting of ammoxidation promoters, ammoniation promoters, dehydrogenation promoters and oxidation promoters is introduced into the catalyst.

8. The process of claim 1 wherein the quantities of the arsenate salt and the ferric salt are so chosen that a catalyst having an atomic ratio of iron to arsenic from 0.5:1 to 1.5:1 is obtained.

9. A composition comprising oxides of iron and arsenic having an atomic ratio of iron to arsenic from 0.1:1 to about 10:1, prepared by the process of claim 1.

10. A composition comprising oxides of iron and arsenic having an atomic ratio of iron to arsenic from about 0.5:1 to about 1.5:1, prepared by the process of claim 4.

References Cited

UNITED STATES PATENTS

| | | | |
|---|---|---|---|
| 3,142,697 | 7/1964 | Jennings et al. | 252—456 |
| 3,156,737 | 11/1964 | Gutberlet | 252—456 |
| 3,179,694 | 4/1965 | Eygen et al. | 252—472 |

FOREIGN PATENTS

| | | |
|---|---|---|
| 999,629 | 7/1965 | Great Britain. |

DANIEL E. WYMAN, Primary Examiner

P. M. FRENCH, Assistant Examiner